G. C. Taft,
Wrench.
No. 98,644.  Patented Jan. 4, 1870.
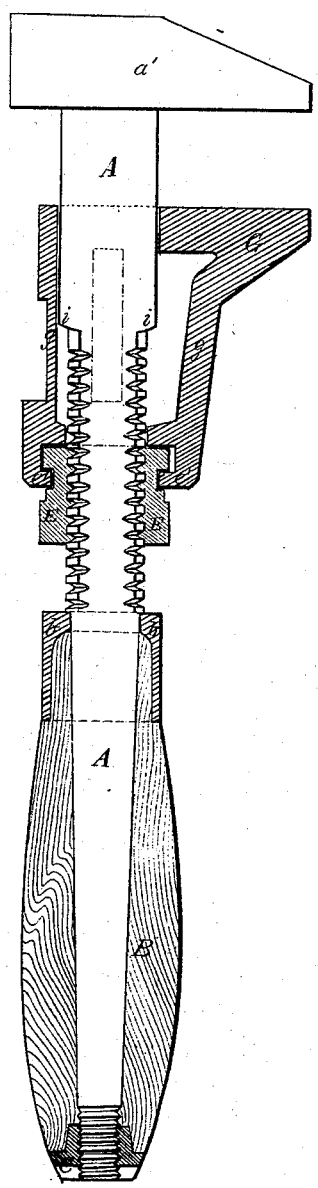
Witnesses
E. W. Anderson,
D. D. Kane
Inventor
Geo. C. Taft,
Chipman, Hosmer, & Co.,
Attorneys.

United States Patent Office.

GEORGE C. TAFT, OF WORCESTER, MASSACHUSETTS.

Letters Patent No. 98,644, dated January 4, 1870.

IMPROVEMENT OF WRENCHES.

The Schedule referred to in these Letters Patent and making part of the same

*To all whom it may concern:*

Be it known that I, GEORGE C. TAFT, of Worcester, in the county of Worcester, and State of Massachusetts, have invented a new and valuable Improvement in Wrenches; and I do hereby declare that the following is a full, clear, and exact description of the construction and operation of the same, reference being had to the annexed drawings, making a part of this specification, and to the letters and figures of reference marked thereon.

Figure 1, of the drawings, is a sectional view of my invention.

My invention relates to screw-wrenches; and consists, mainly, in the construction and novel arrangement of devices, whereby the wrench-bar is strengthened and made more serviceable.

The letter A designates the wrench-bar, attached to the fixed jaw $a'$ of the wrench.

In forging this bar, the metal is banked between the jaws, making it very strong in this part, which is subject to the greatest strain.

At the same time, in order that the instrument shall not be more weighty than those now in use, a shoulder, $i$, is formed on each side of the bar, below this strengthened part, and that portion of the bar on which the thread is cut, is made correspondingly smaller.

From the end of the screw-thread, the bar is tapered during the rest of its length, until it reaches the end of the handle B.

Here a screw-thread is cut on it, and a nut, C, is used to secure the bar firmly in the handle.

$b$ is a thimble, used to prevent the handle from splitting.

E is the operating screw-ring, made smaller than those now in use, in consequence of the smaller size of that portion of the bar on which it moves.

G represents the movable jaw, operated by the screw-ring E.

It has a double clutch, $e'$, fitting the lip of the screw-ring E, both in front and in rear.

This clutch is connected to the jaw by a casing, $g$, passing in rear as well as in front of the wrench-bar, in such a manner as to protect the sliding surfaces and screw-thread from grit or other extraneous matter.

What I claim as my invention, and desire to secure by Letters Patent, is—

The combination and arrangement of the reinforced bar A, with shoulders $i$, nut C, jaw G, clutch $e$, casing $g$, and handle B, with its nut and thread as described, as and for the purposes specified.

In testimony that I claim the above, I have hereunto subscribed my name, in the presence of two witnesses.

GEO. C. TAFT.

Witnesses:
JAMES H. BANCROFT,
JOHN RAY.